United States Patent [19]

Ethington et al.

[11] Patent Number: 4,690,743

[45] Date of Patent: Sep. 1, 1987

[54] METHOD FOR GAS SYNTHESIS

[75] Inventors: Don Ethington, Dimmitt; Ray J. Riley, Hart; Richard W. Tock, Lubbock, all of Tex.

[73] Assignee: AL-CHEM Fuels, Inc., Dimmitt, Tex.

[21] Appl. No.: 729,567

[22] Filed: May 2, 1985

[51] Int. Cl.$^4$ ............................................. C07C 3/24
[52] U.S. Cl. ................................. 204/168; 204/170; 204/173
[58] Field of Search ....................... 204/168, 170, 173; 252/373; 48/65, 200, 201, 202, 210

[56] References Cited

U.S. PATENT DOCUMENTS 2,023,754 12/1935 Uhlmann ................................ 48/65
3,169,915 2/1965 Kennedy ............................ 204/168

OTHER PUBLICATIONS

Mort Schultz, "Fuel for the Fuhrer," *Popular Mechanics*, (Nov. 1979), pp. 102-103, 162.
"Atmospheric Electricity," Conduction of Electricity, Electric Power, *Encyclopaedia Britannica*.
Mort Schultz, "Fuel for the Future-Coal for Your Car," *Popular Mechanics*, (Dec. 1979), pp. 77-78, 124.
James H. Kelley and Eugene A. Laumann, "Hydrogen Tomorrow-Demands & Technology Requirements," Report of the NASA Hydrogen Energy Systems Technology Study, (Dec. 1975), pp. 77-101.
Robert W. Coughlin and Mohammad Farooque, "Thermodynamic, Kinetic, and Mass Balance Aspects of Coal-Depolarized Water Electrolysis,", *Industrial Engineering Chemical Process, Design, and Development*, vol. 21, No. 4, (1982), pp. 559-564.
Robert W. Coughlin and Mohammad Farooque, "Anodic Coal Reaction Lowers Energy Consumption of Metal Electrowinning,", *Nature*, vol. 280, (Aug. 1979), pp. 666-668.
Robert W. Coughlin and M. Farooque, "Hydrogen Production from Coal, Water and Electrons,", *Nature*, vol. 279, (May 1979), pp. 301-303.
Robert W. Coughlin and Mohammad Farooque, "Electrochemical Gasification of Coal-Simultaneous Production of Hydrogen and Carbon Dioxide by a Single Reaction Involving Coal, Water, and Electrons", *Industrial Engineering Chemical Process, Design, and Development*, vol. 19, No. 2, (1980), pp. 211-219.
D. O. Moore, T. A. Czuppon, and B. G. Mandelik, "Hydrogen from Coal Using Pressurized Gasification,", Pullman Kellogg Research and Development Center, Houston, Texas, pp. 803-806.

(List continued on next page.)

*Primary Examiner*—John F. Niebling
*Attorney, Agent, or Firm*—Wendell Coffee; Montgomery W. Smith

[57] ABSTRACT

A medium to high BTU fuel gas is synthesized in a closed tank using a diffuse electrical plasma. An electrode is disposed within, and electrically insulated from, an interface between immiscible mixtures of water and oil in the tank. Comminuted fossil fuel or carbon particles are dispersed in the oil near the interface. A voltage step up transformer connects a potential of about 2-5 kV (kilovolts) across an arc gap between the electrode and the water-oil interface. Electrical breakdown of the oil, due to the high voltage, produces an initial arc across the gap, which at steady state becomes a diffuse, partially-ionized, stable plasma. The electron flow in the plasma chemically and catalytically reforms compounds in the water and oil layers. A capacitor, connected across primary windings of the transformer, has a selected capacitance sufficient to modify the AC voltage and current waveforms so that the power factor of the combined circuit across the arc gap approaches unity. This significantly enhances the efficiency of the plasma as a chemical reformer. The interface spaced opposite the electrode is formed by an open top tray disposed within the oil opposite the electrode. Water is continuously added to the tray to fix the position of the water-oil interface with respect to the electrode at the overflow level of the tray. A chamber is positioned above and around the plasma to collect the gases which escape from the ionized reaction zone.

14 Claims, 8 Drawing Figures

OTHER PUBLICATIONS

"Proceedings Specialists' Workshop on Fast Pyrolysis of Biomass,", Copper Mountain, Colorado, Oct. 19-22, 1980, pp. 5, 15, 17, 28, 30-32.

Carl R. Noller, *Textbook of Organic Chemistry*, 2nd Ed., (Philadephia: W. B. Sauders Company, 1958), p. 118.

R. Norris Shreve, *CPI, Chemical Process Industries*, 3rd Ed., (McGraw Hill, 1967), pp. 764-766.

Francis Weston Sears and Mark W. Zemansky, *University Physics*, 2nd Ed., (Reading, Massachusetts: Addison-Wesley Publishing Company, 1955), pp. 680-681.

Lawrence H. VanVlack, *Elements of Materials Science and Engineering*, 4th Ed., (Reading, Massachusetts: Addison Wesley Publishing Company, 1980), p. 151.

Walter J. Moore, *Physical Chemistry*, 2nd Ed., (Englewood Cliffs, New Jersey: Prentice-Hall, Inc., 1955), pp. 614-615.

Jerold M. Schultz, "Polymer Materials Science,", (New Jersey: Prentice-Hall, Inc., 1974), pp. 442-448.

METHOD FOR GAS SYNTHESIS

CROSS REFERENCE TO RELATED APPLICATIONS

None. However, applicant filed Disclosure Document No. 132,654 on Nov. 19, 1984, which document concerns this application; therefore, by separate paper it is respectfully requested that the document be retained and acknowledgment thereof made by the Examiner. (MoPEP 1706)

BACKGROUND OF THE INVENTION (1) Field of the Invention

This invention relates to a process and apparatus, for chemically reforming compounds in the presence of an electrical discharge plasma into a desired product gas mixture. Applicants designate one with ordinary skill in the art to be a chemist, or chemical engineer, or other person having familiarity with the chemical and electrolytic synthesis of fuel gases.

(2) Description of the Prior Art

Prior to our invention, others recognized the need for a process and apparatus to synthesize a medium to high BTU content fuel gas from readily available compounds, such as water and hydrocarbons, and in some cases coal. Some examples of the efforts of workers in the art were revealed in a search of the Patent Office records requested by applicants prior to filing this application. A list of the patent references developed during that search appears below:

| U.S. Pat. Nos. | |
| --- | --- |
| BLUMENBERG | 1,379,077 |
| YARD ET AL | 1,703,505 |
| BLEECKER | 1,837,519 |
| WINKLER | 1,857,799 |
| BLEECKER | 1,862,952 |
| STEVENS | 1,938,121 |
| WEBER | 2,029,748 |
| BUTLER | 2,660,556 |
| TRANTHAM | 2,994,377 |
| DRYDEN | 3,696,866 |
| VESTAL | 3,870,611 |
| STOWELL ET AL | 4,010,089 |
| CARPENTER | 4,037,655 |
| CARR ET AL | 4,233,132 |
| Japanese Patents | |
| JAPAN | 42-24312 |
| JAPAN | 47-33284 |

Although the above references do not appear to directly pertain to applicants' invention, it is believed that the references do show the state of the art.

It appears from the references cited above that advances in this art tend to be limited and nonrevolutionary. Before our invention, synthesized fuels, especially those made by processes using electricity, were expensive in comparison with naturally occurring fuel gases. Even small improvements in the efficiency of a fuel synthesis process or apparatus often represents a great stride forward in the art.

Some of the references listed above disclose the synthesis of fuel gas from coal, water, and liquid hydrocarbons, wherein an electrode is wholly disposed within an oil layer, and spaced a selected distance away from the interface between a water layer and the supernatant oil layer. Electrical current is passed between the electrode tip and the interface to cause a heating of the components in the layers.

One problem with the prior art processes is that in order to disassociate molecules by electrolysis, large amounts of energy are required. Other processes that simply heat the oil layer to strip volatiles from the oil layer, do not reform compounds, such as water into useful fuel.

Another problem with the prior art is that of maintaining a constant distance or spacing of the immiscible interface from the electrode tip. For example, prior art devices had to be maintained absolutely still, and thus were fixed power sources.

SUMMARY OF THE INVENTION (1) New Function and Surprising Results

We have solved these problems, and have made possible great advances in gaseous fuel and chemical feed stock synthesis, with a novel process and structure for minimizing the power usage incident to chemical reformation of components in a tank with electricity. The structure and process employed with our invention utilizes a conductor which is spaced and insulated from an electrode. This conductor may be in the form of another electrode, as more fully described hereinafter. The conductor is preferably in the form of an electrically conductive liquid stratum or layer that is substantially immiscible with and below a substantially electrically insulative liquid mixture.

Thus, the function of the insulative mixture is to provide sufficient resistance or insulation between the electrode and the conductor that the application of sufficient voltage will result in the production of an arc discharge therebetween. The arc is repetitively produced across the gap because electrical breakdown of the insulative and conductive mixtures due to the high voltage decreases the resistance within the small space between the conductor and electrode. As the repetitive arcing continues, the system approaches steady state, wherein a semiconductive plasma is formed between the electrode and the conductor, having a stable, high-ionization high temperature core, surrounded by a diffuse, partially-ionized plasma void. If the insulative characteristics of the insulative stratum or mixture are not sufficient, current will flow across the gap, with no arc discharge, and greatly reduced chemical and catalytic reformation.

The transformer required to step up standard available voltage to produce an arc discharge between the electrode and the interface between the oil and water mixture tends to increase the phase difference between the current waveform and the voltage waveform of the alternating current that produces the arc, and ultimately establishes and maintains the stable plasma lens. In the case of this induced alternating current, since the current peak tends to lag behind the voltage peak, when polarity switches at each half cycle of the alternating current, the flow of electrons lags behind and the effectiveness of the plasma lens in chemical reformation is adversely affected.

Having discovered this problem, we solved it by placing a capacitor across the primary terminals of the transformer, thereby introducing capacitance in parallel to, or across, the primary windings of the transformer, modifying the current producing the plasma lens so that the phase difference between the voltage and current waveforms approaches zero. With our invention, the current peak, and inrush of electrons, is as close in time as feasible to changes of polarity. This permits the utilization of much lower current densities, and hence, significantly less power usage at a given voltage. When so modified, the plasma lens and electron flow produces unexpectedly and surprisingly enhanced effects on the chemical and catalytic reformation of components drawn into the plasma by electromagnetic forces.

The heat released by the repetitively reproduced arc forms a plasma gaseous void, or plasma lens, or visible corona discharge, that includes partially ionized but stable plasma, between the electrode and the conductor, or interface as described above. At the same time, an electrophoresis effect created by the flow of electrons causes a swirling, thermal siphon about the gaseous plasma void, which tends to cause mixing and feed of the constituents of both the insulative and conductive strata or mixtures to the plasma lens and the stable high-temperature, high-ionization core for chemical and catalytic reformation.

The intense electrical energy and electron discharge or bolt released by the breakdown of the water and the oil is believed to chemically reform components of both mixtures that are at the plasma lens. The electron flow of the electrical current shifts chemical reformation toward the formation of electrically conductive species. Thus, chemical reformation of unexpected and unique compounds for chemical reforming processes is accomplished within a very small space with a very simple, inexpensive structure.

We have also discovered that our invention may be used with conductive and insulative mixtures and strata that include components other than, or in addition to the coal, liquid hydrocarbons, and water described herein. Therefore, it will be understood that the scope of our invention extends beyond the carbon, water, and oil systems disclosed in the prior art references. An embodiment of our invention using two electrodes could be employed using almost any insulative compound with the selective and appropriate feeding of other compounds in proximity to the gap between the electrodes.

However, we prefer to use a structure and process involving an electrode disposed within an insulative mixture and spaced from an interface at a conductive immiscible mixture therebelow. Almost any components can be used so long as the two mixtures are substantially immiscible, and the insulative mixture has the appropriate electrical conductivity, as described above, so as to require the production of an arc discharge before a stable current flow and plasma can be established. For example, as described later, we have have conducted separate experiments utilizing vinegar, and ethylene glycol with some water therein, as the conductive mixture, which produced a notable decrease in the amount of hydrogen produced and therefore a higher BTU fuel rated product gas.

Our invention preferably uses a tray, or open-topped receptacle, positioned within the insulative layer, with the open top centered opposite the electrode tip. The tray is filled with the conductive mixture. Constant feed of the conductive mixture into the tray overflows the tray edges, and flows down into the conductive mixture below.

Thus, by positioning the lips of the tray an appropriate distance from the electrode tip, the interface between the conductive mixture in the tray and the insulative mixture, is maintained at a constant overflow level. This allows for precise setting and adjustment of the arc gap between the electrode tip and the interface.

Our invention also preferably includes the positioning of an open bottomed chamber, preferably in a bell shape, around and slightly above the electrode tip. An edge of the bottom of the chamber is flared away from the electrode and the interface sufficiently to avoid interference with or short circuiting of the electrical arc, or current flow through the plasma between the electrode and interface. The chamber maintains an intimate mixture of the product gases in gaseous, nonliquid contact for a finite residence time. Additionally, a catalyst may be conveniently placed within the chamber to further alter the product gases by continued reaction of the components in the product gas mixture.

We also recognize that the entire reaction tank may be pressurized to enhance or increase the formation of certain types of hydrocarbons, and decrease the formation of free hydrogen. However, even operated at ambient pressures, the proportion of hydrogen in synthesis gas generated by our process is far less in comparison to the synthesis gas formed with prior art processes.

We have also determined that in addition to serving as a fuel gas having a moderate to high BTU fuel rating, the product gases made according to our invention and the processes and apparatus described herein may be suitably modified to serve as feed stock for other petrochemical processes. Our apparatus and process makes it feasible for chemical manufacturers to make a relatively small investment, and produce synthesis gases that are well suited for use as feed stocks in organic synthesis.

Thus our invention accomplishes chemical reformation of compounds on a very small scale with a simple, inexpensive structure that is easily adaptable to larger economies of scale, and that provides for unexpected enhancement of chemical reformation and surprising product gas mixtures, having varied characteristics which can be specified as desired by the user.

Thus, it may be seen that the total function of our invention far exceeds the sum of the functions of the individual parts such as electrodes, tanks, pumps, valves, etc.

(2) Objects of this Invention

An object of this invention is the synthesis of a hydrocarbon fuel gas.

Another object of this invention is synthesis of a gas having described components in desired proportions.

Another object of this invention is the chemical reformation of liquid components disposed within a tank into a synthesis gas mixture.

Still another object is the maintenance of a preselected finely adjusted gap between a liquid interface and an electrode.

A further object is the minimization of power required to synthesize such gases.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

Further objects are to achieve the above with a product by the above process that is safe, versatile, efficient, stable and reliable, yet is inexpensive and easy to manufacture and use.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENTS

Figure 1:
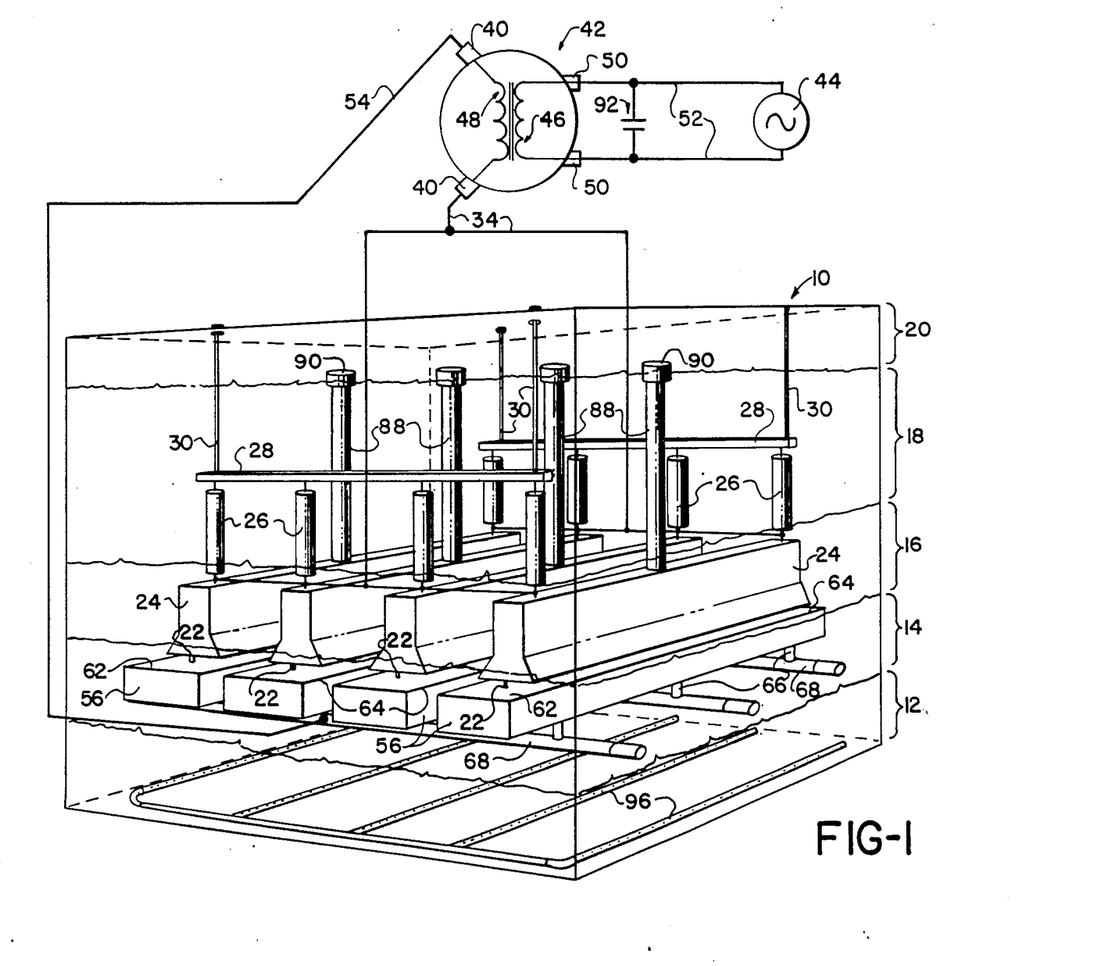
FIG. 1 is a perspective view of the internal structure of a fuel synthesizer tank according to our invention.
Figure 2:
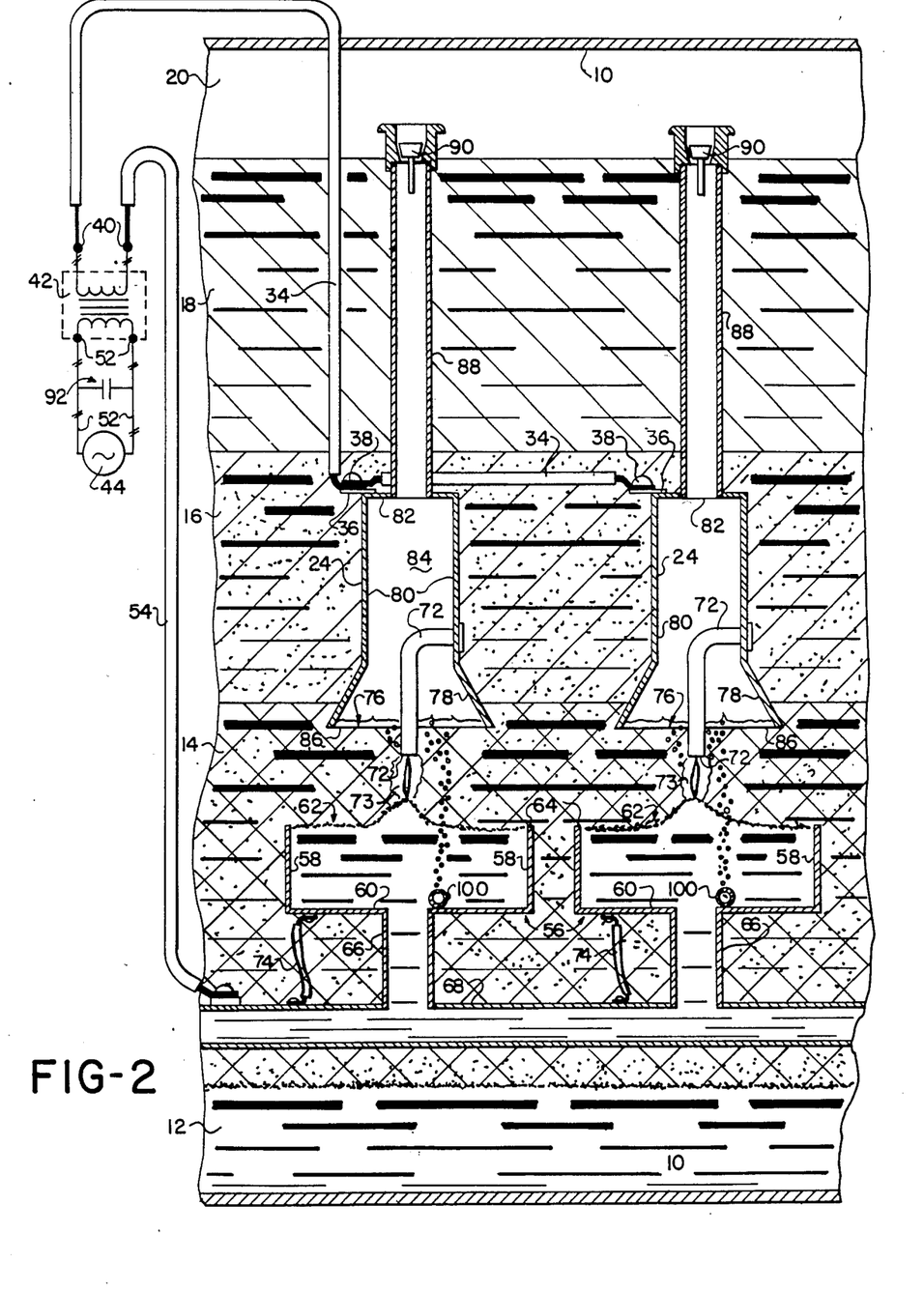
FIG. 2 is a somewhat schematic section view taken substantially along line 2—2 of FIG. 1.
Figure 3:
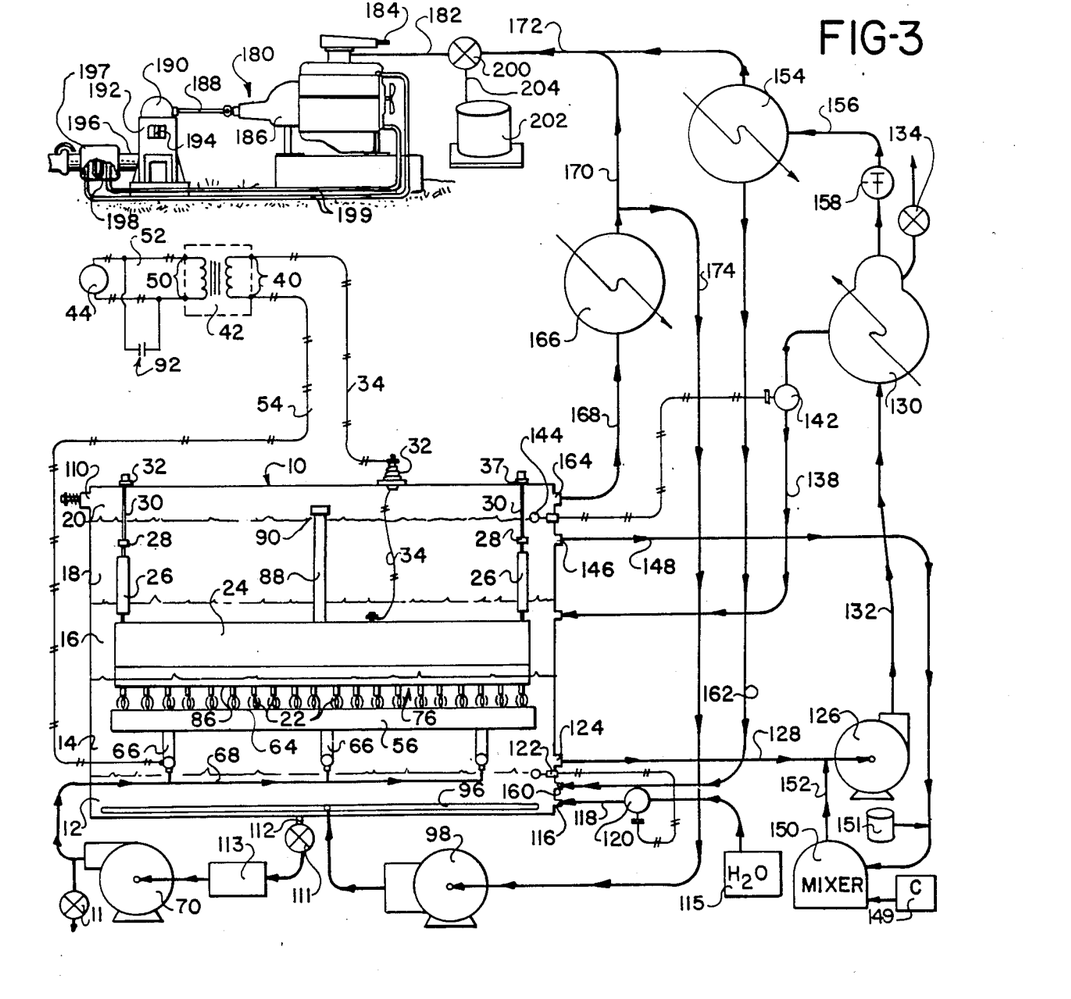
FIG. 3 is a somewhat schematic side view of the tank shown in FIG. 1 with the associated structure for processing the liquids and gases used in the synthesis and produced by the synthesis process.

The preferred application of our invention is to the production of a product gas having a BTU fuel rating of at least 500 BTU's per standard cubic foot which is sufficient to operate an internal combustion engine, preferably driving an irrigation well, as schematically shown in FIGS. 1, 2 and 3, and described below.

The synthesis process preferably occurs within closed top tank 10. The tank 10 is adapted to contain both liquids and gases, with free gases within the tank being primarily disposed at a top thereof. Water stratum 12 is disposed within the tank at a bottom thereof. The water stratum 12 is formed by a water mixture that includes pure water. The water mixture is preferably hard water, containing metallic salts, such as calcium, magnesium, and sodium carbonates or sulfates, or the like. The hard water, being more ionic, is a better conductor of electricity than is pure or distilled water.

Of course, other compounds could be added to water to make it more electrically conductive, although we prefer to use cheap readily available hard water for our irrigation application as it is pumped from underground aquifers, or surface lakes and streams.

A thick layer of oil, or insulative mixture, which is substantially immiscible with water, and therefore, with the water stratum, is disposed within the tank above and supernatant to the water stratum 12. The thick layer of oil may be seen to have three sublayers or strata therein: semiconductive stratum 14, emulsoid stratum 16, and oil stratum 18. The semiconductive stratum 14 is disposed immediately above the water stratum 12, the emulsoid stratum 16 is disposed immediately above the semiconductive stratum 14 and the oil stratum 18 is disposed immediately above the emulsoid stratum 16. Gas stratum 20 is disposed within the tank at the tank top, above the oil stratum 18.

As will be described more fully later, the semiconductive stratum is formed after startup by the chemical reformation of compounds within the tank that are dissolved in the lower portion of the emulsoid stratum 16 to form the more conductive semiconductive stratum 14.

The oil within the semiconductive, emulsoid, and oil strata 14, 16, and 18, respectively, preferably includes a liquid hydrocarbon mixture that is substantially nonvolatile. It is believed that the diesel fuel, disclosed herein for use as an insulative liquid or mixture, has about the most volatility that can be tolerated for the insulative mixture used in our process and apparatus. Some examples of other hydrocarbon fossil-fuel based compounds that may be used as insulative mixtures are brake fluid and transformer oil. Some agriculturally based compounds for use as insulative liquids are cotton oil, peanut oil, safflower oil and the like, having low volatility and conductivity. Silicon oil is an example of a nonhydrocarbon based insulative liquid.

It is the desired result of the synthesis process that as little of the diesel oil be used or chemically reformed as is feasible, simply because it is the most expensive material used within the process. It is preferred to use as much water and comminuted coal as possible.

We prefer to use comminuted lignite as the coal, or source of atomic carbon, for synthesis of hydrocarbons and to tie up the oxygen, produced during chemical reforming of the water, as carbon oxides, principally carbon monoxide. Lignite is preferred because it is readily accessible and relatively inexpensive in the Southwestern United States. Lignites also have more organic materials therein, which make the emulsoid less insulative, requiring lower voltage to produce an arc discharge and plasma lens, or ionized reaction zone, 73. Coke, coals other than lignite, or even biomass, such as manures, sewage effluent and the like that will serve as a source of carbon, and/or contain organic compounds that tie up oxygen may be employed. Other beneficial uses will be described later.

The emulsoid and semiconductive strata include an emulsoid formed by the substantially uniform distribution and mixing of comminuted coal particles throughout the layer. As may be seen in FIG. 3, the emulsoid stratum is maintained by adding and withdrawing the comminuted coal, diesel oil mixture at predetermined locations on the tank. Under these conditions, the emulsoid stratum will be maintained substantially distinct from the oil stratum 18.

The semiconductive stratum 14 includes the components of the emulsoid stratum 16 and in addition includes organics, carboxylic compounds, and other by-products of the chemical reformation described later, dissolved in the semiconductive stratum.

The respective strata 14, 16, and 18 have differing electrical conductivities. The oil stratum 18 is the most insulative, having a very low conductivity. Because of the presence of the finely distributed coal particles, the emulsoid stratum 16 will be slightly more conductive than the oil stratum. Because products of the chemical reformation are present therein, the semiconductive stratum 14 is more conductive than the emulsoid stratum 16. However, the semiconductive strata 14 still insulates the electrode from the much more conductive water stratum 12, such that an arc can only be created or produced with high voltage.

Electrodes 22 are disposed within the semiconductive stratum 14. The electrodes 22 are preferably attached to and depend from within elongated chambers 24 disposed within the emulsoid and semiconductive strata 14 and 16. Of course, other means for attaching the electrodes to the chambers 24, or for positioning them independently of the chambers 24, could be employed and still be within the scope of our invention.

The chambers 24 and electrodes 22 are insulated from the tank 10 by insulators 26, which are adjustably connected to the top of the tank 10. The adjustable connection of the insulator chambers and electrodes is in the form of suspension bars 28, connected to a top of the tank 10 by adjustment members 30, and connected by the insulators 26 to the chambers 24. The adjustment members 30 are preferably simultaneously adjustable so as to permit raising or lowering of the chambers and electrodes 24 and 22 as a whole.

Insulators 32 are disposed at the top of the tank 10. Electrode wires 34 extend downward from the insulators 32 through the oil stratum, which is itself insulating, and the emulsoid stratum 16, to tabs 36 on the chambers 24. The wires 34 are secured by tab screws 38 to the tabs 36. We constructed the insulators 26 of commercially available fiberglass, round stock, ⅜" outside diameter, drilled and tapped at the ends for adjustment bolts. The insulators 32 were manufactured in a similar manner. We prefer to use commercially available 20 kilovolt, #16, insulated wire for all electrical wiring.

The electrode wires 34 are connected through the insulators 32 to one of two secondary terminals 40 of transformer 42. The transformer 42 is preferably a commercially available step-up, or voltage increasing, transformer with a 240 volt AC input and a desired output voltage between 2,000 volts AC and 10,000 volts AC, and preferably between 2,000 volts AC and 5,000 volts AC.

The transformer 42 has primary windings 46 and secondary windings 48, as those with ordinary skill in the electrical engineering field are well aware. The secondary terminals 40 provide for connection across the secondary windings 48, whereas primary terminals 50 provide for electrical connections across primary windings 46. The primary terminals 50 are connected by source wires 52 across a source of alternating electrical current 44. Tank wire 54 connects the tank to the other secondary terminal 40 not connected to the electrode wires 34 to complete the circuit from across the source 44 to across the water stratum 12 and the electrodes 22. Of course, the strata 14, 16, and 18 insulate the electrodes and chamber from the tank.

Open topped tray 56 has sides 58, bottom 60, and open top 62. The open top is disposed below and opposite the electrodes 22 for each of the chambers 24. Overflow lips 64 provide for maintenance of a maximum fill level for the trays 56.

Tray pipes 66 are fluidly connected to the bottoms of the trays 56 at one end and to tray manifold 68 at their other end. The tray pipes 66 also provide support for the trays 56 within the semiconductive stratum 14. It will be noticed that although the trays are wholly disposed within the semiconductive stratum 14 that it is only required that the overflow lip be positioned somewhat above the water stratum 12 to allow for fluctuations in level of the water stratum 12 within the tank.

The tray manifold 68 extends through the tank 10 side and is fluidly connected to an outlet of tray pump 70. An inlet of the tray pump 70 is fluidly connected through the side of the tank 10 to the water stratum 12 which serves as a source of the water or conductive mixture to be flowed to the tray. The tray pipes 66, manifold 68 and pump 70 all form supply means for flowing water or conductive mixture from a source thereof to the tray.

Continuous operation of the tray pump 70 will provide for a constant flow of water into the tray. The overflow lips 64 will maintain the trays at their maximum fill level. Thus, a constant position interface between the water and the tray and the substantially immiscible semiconductive stratum or mixture is established within the trays 56 spaced from electrode tip 72 of the electrodes 22.

It may also be seen that the pipes 66 and the tray manifolds 68 are electrically connected to the tak 10 by tray wires 74. Therefore the electrical circuit between the secondary terminal 40 and the interface is primarily through the tank wires 54, tray pipes 66, manifolds 68, and trays 56, which are preferably formed of highly conductive metal.

Referring to FIGS. 1, 2, and 3, the chambers 24 may be seen to be somewhat bell shaped in cross section such that each chamber has open bottom 76, flared sides 78, straight sides 80, top 82, and ends 84. The sides 78 are flared to space bottom edges 86 of the chambers 24 away from the electrodes.

The bottom edges are also spaced away from the interfaces within the trays 56 more than the electrodes to avoid short circuiting or arcing between the chambers 24 and the interfaces. Likewise, the lips at the tops of the trays are also spaced away from the bottom edges of the chambers to avoid any arcing between the chambers and the trays. This is because it is desirable that the arc and resulting plasma lens will be at a predetermined position below the chambers 24.

Thus, the open bottoms of the chambers 24 are positioned above the position of the plasma so as to capture product gases escaping upward therefrom. Gas tubes 88 are fluidly connected at one end to the chamber tops 82 and extend for this embodiment through the semiconductive and emulsoid strata to just above the interface between the oil stratum 18 and the gas stratum 20. Of course, if desired, the gas or outlet tubes or pipes 88 could be fluidly connected to a gas outlet to almost completely isolate the product gas from the liquids in the tank after production.

The gas tubes 88 preferably have valve means in the form of pressure valves 90 therein for maintaining a desired preselected pressure within the chambers 24. The pressure of which the valves 90 open to release product gas mixture from the chambers is preferably selected to exclude liquids from the chamber interior to a desired extent. The level of liquids in the chamber is preferably slightly past the bottom edges 86, since it is desired not to bubble product gas mixture past the bottom edges 86.

For certain synthesis processes, it is desirable to catalytically reform components of the product gas mixture collected in the chambers 24. Catalyst screens 91, coated with a magnesium salt, shown in the chambers in FIG. 2, are exemplary of a structure for disposing a catalyst within the chambers for catalytic reformation or reaction of the gases in the product gas mixture, and with the use of sparge tubes or pipes, described later, with added gases. Of course, other structure for mounting the catalyst in the chambers 24, or even in the outlet tubes 88, may be used and still be within the scope of our invention.

Thus, once produced in the plasma, and collected within the chambers 24, the product gases are substantially maintained in contact with other product gases as a product gas mixture in the chamber, instead of being in contact with liquids in the strata 14, 16, 18 as the product gases would bubble up after production if the chamber were not used. Additionally, by maintaining the pressure and selectively releasing the product gas mixture, the product gases are maintained within the chamber in contact for an average residence time.

Thus, given the above structure, the synthesis process for this embodiment of our invention may be seen to occur as follows, with one additional aspect of our invention disclosed hereafter.

The tank 10 is filled with water and oil, and the emulsoid stratum 16 formed within the oil layer below the oil stratum 18. On start up the semiconductive stratum will not be formed, and will consist of the same components as the emulsoid stratum 16. The water is flowed into the tray which is disposed wholly within the nonconducting insulative strata opposite the electrodes.

The source of alternating current is connected to the transformer at the primary terminals 50 causing high voltage alternating current to be applied across the electrode and water within the trays 56. We have observed that the water at the interface in the trays 56 will tend to peak beneath the electrode from the effects of an electrophoresis-induced vortex caused by the magnetic field generated by the application of the current across the electrodes and the water interfaces. This peaking decreases the arc gap, and decreases the resistance, which, combined with electrical breakdown of the oil, produces an arc discharge.

Repetition of the arcs, substantially in concurrence with the alternating cycles of the alternating electrical current at the source, commonly 60 cycles per second in the United States, produces an apparent continuous electrical arc between the electrodes and the interfaces within the trays. The arc discharges create a diffuse ionized plasma positionally associated with the gap between the electrode and the interface, which is maintained by continued current flow through the semiconductive, ionized plasma gases.

The electrophoresis-induced vortices about these plasma lenses and the hydrostatic pressure of the liquids force components within the liquids in the strata 12 and 14 into the plasma where the effects of the electrical current and high temperature cause chamical and catalytic reformation. As product gases are produced by this chemical reformation, they tend to escape from the plasma upward into the chambers 24. The captured gases are then flowed through the gas tubes 88 to a gas outlet here in the form of a pipe connected to the tank sides near the top thereof.

We have discovered that electrical power consumption used in maintaining the plasma lenses and chemical reformation is minimized if we connect capacitor 92 across the primary terminals 50, in parallel to the load and to the source of AC current 44. As used herein, the "load" will be understood to refer to the primary windings of the transformer. As described above in the "Summary of the Invention" section, the induced alternating electrical current resulting at the secondary terminals and applied across the electrode and interface within the trays typically has an increased phase difference between the voltage and current waveforms than the current applied across the primary terminals. This is inefficient, since the electron flow lags the reversal of polarity. Therefore we prefer to place the capacitor 92 having a capacitance value such that the phase difference between the voltage and current waveforms of the alternating electrical current applied across the electrodes and the interfaces within the trays 56 is or approaches zero, thereby resulting in a power factor of the current connected across the electrode and conductor, producing the current flow through the plasma, that approaches unity. We believe that in addition to resulting in a lower usage of power, this usage of electron flow synchronized with polarity reversal produces surprising and beneficial effects in the chemical reforming and synthesis of gases within the plasma lenses or voids, than is achieved without this capacitor 92.

We use the terms "phase difference between voltage and current waveforms of the alternating electrical current flowed between the electrode and the conductor". We also use the term "power factor approaches unity". Because one with ordinary skill in the chemical engineering or chemical reforming art would not be familiar with these terms as opposed to one with ordinary skill in the electrical engineering art, a brief description of these terms and their customary usage in the electrical engineering art is provided. For a more in depth treatment, and assistance if the aid of an electrical engineer is not obtained, those with ordinary skill in the art may consult any standard electrical engineering textbook for further elucidation.

At any point of an alternating electrical current "AC" circuit, electricity flowed may be described by voltage and current waveforms. For convenience, as is the customary practice in basic electrical engineering, a sinusoidal waveform is assumed, although in reality these waveforms may take various complicated shapes. However, for ease of understanding the current and voltage waveforms are assumed to appear as substantially shown in FIG. 6. The current curve or waveform 13 is labeled "i" and is shown by an evenly dashed line, whereas the voltage waveform is labeled "v" and is shown by a long and short dashed line. These waveforms extend over time "t" along the horizontal axis and between zero and over positive and negative values along the vertical axis.

Figure 6:
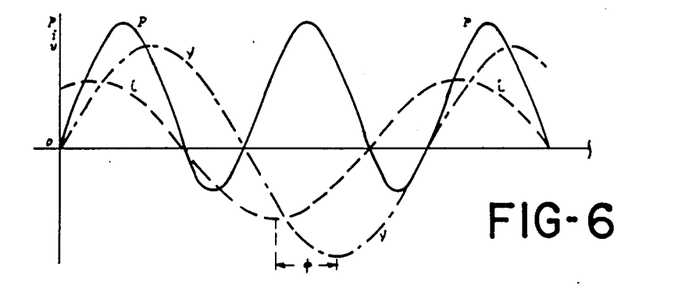
FIG. 6 is a graph showing the current and voltage waveforms of an illustrative AC circuit, as is well known in the electrical engineering art.

As shown in FIG. 6, although the current and voltage waveforms have the same frequency, such that the length of each cycle is the same, the waveforms may be offset, or out of phase, as is commonly the case. This phase difference "$\phi$" represents the phase angle between the voltage and current waveforms, or as referred to herein, the phase difference between the current and voltage waveforms.

Various characteristics of the AC circuit can effect the phase difference between the voltage and current waveforms. A straight resistance does not effect the phase angle appreciably, whereas an inductance, such as that introduced by a transformer, causes the current waveform to lag behind the voltage waveform, as exemplified by the waveforms shown in FIG. 6. A capacitance introduced into the circuit will decrease the angle by which the current waveform lags behind the voltage waveform, or if large enough will cause the current waveform to lead the voltage waveform.

Electrical engineers have long used the terminology "power factor" to describe the relationship of the phase difference to the average power of a circuit, customarily by the equation $$P = VI \cos \phi,$$

where cos φ is called the "power factor". The "power factor" may range between values of zero and one. Thus, when the phase difference is zero, the power factor will be one, or unity, which for a given voltage and current value results in the highest power P. From a different viewpoint, the nearer the power factor is to unity, the less current is required for a given voltage to produce a given average power in an alternating current circuit.

Insofar as this pertains to applicants' invention, we have discovered that it is necessary to reduce the phase difference between current and voltage waveforms to zero, or to modify the waveforms so that the power factor approaches unity. With a unity power factor, the inrush of electrons across the gap between the electrode and the conductor will occur simultaneously, or as near in time as possible, to the reversal and building of potential across the gap to produce current discharges. As described above for the capacitor 92, placing the an appropriate capacitance across the primary windings of the transformer, causes the power factor of the AC electrical flow across the gap to approach unity, and reduces power requirements. Of course, the value of the capacitance depends upon the voltage used, the coupling coefficient of the transformer, the resistance across the gap, and other factors.

For the data outlined hereafter, we employed several commercially available transformers that increase the voltage from a standard 220 volts AC to 2,400 volts AC. The materials used as stated above were hard water for the conductive mixture and diesel oil with comminuted coal particles mixed therein for the insulative mixture. We have determined that with the use of the capacitor as described, more efficient gas synthesis results. With the capacitor placed across the primary windings, about half the current is drawn in comparison with the current drawn without the capacitor.

Table I and II show some data for experimental runs using apparatus as described above. It may be noted that the amount of unsaturated hydrocarbons and carbon monoxide in our product gas mixture is substantial and that the amount of hydrogen produced is much less than with prior art gas synthesis. Additionally it may be noted that the power usage of our device is far below that commonly disclosed in the prior art.

TABLE I

Product Gas Mixture Using Diesel Oil With Comminuted Bituminous Coal; Hard Water

| Gas | Mole % | Gas | Mole % | Gas | Mole % |
|---|---|---|---|---|---|
| $H_2$ | 68.9 | $C_2H_6$ | 0.1 | $C_3H_8$ | 3.2 |
| CO | 18.0 | $C_2H_4$ | 1.7 | $C_3H_6$ | 0.4 |
| $CO_2$ | 0.2 | $C_2H_2$ | 4.0 | $C_4$ | 0.7 |
| $CH_4$ | 1.9 | — | — | $C_{5+}$ | 1.0 |

TABLE II

Product Gas Mixture Using Diesel Oil With Comminuted Lignite Coal; Hard Water

| Gas | Mole % | Gas | Mole % | Gas | Mole % |
|---|---|---|---|---|---|
| $H_2$ | 61.2 | $C_2H_6$ | 0.2 | $C_3H_8$ | 0.1 |
| CO | 20.9 | $C_2H_4$ | 2.1 | $C_3H_6$ | 0.6 |
| $CO_2$ | 3.8 | $C_2H_2$ | 5.6 | $C_4$ | 0.3 |
| $CH_4$ | 2.6 | — | — | $C_{5+}$ | 2.6 |

Table III shows the results of an experimental test run using water as a conductive mixture with vinegar (acetic acid) mixed therein to make the conductive mixture more conductive. It may be noted that the amount of hydrocarbons increased and the amount hydrogen produced decreased.

TABLE III

Product Gas Mixture Using Diesel Oil With Comminuted Lignite Coal; Water With 5% Acetic Acid (Vinegar)

| Gas | Mole % at t = 2 hours | Mole % at t = 34 hours | Gas | Mole % at t = 2 hours | Mole % at t = 34 hours |
|---|---|---|---|---|---|
| $H_2$ | 61.40 | 60.97 | $C_2H_2$ | 6.59 | 6.74 |
| CO | 20.57 | 23.05 | $C_3H_8$ | 0.05 | 0.06 |
| $CO_2$ | 3.39 | — | $C_3H_6$ | 0.73 | 0.86 |
| $CH_4$ | 2.95 | 3.07 | $C_4$ | 0.40 | 0.42 |
| $C_2H_6$ | 0.12 | 0.22 | $C_{5+}$ | 1.50 | 1.91 |
| $C_2H_4$ | 2.31 | 2.60 | — | — | — |

Table IV shows the results of an experimental test using ethylene glycol as the conductive mixture with water mixed therein which resulted in the lowest amount of hydrogen production and the greatest amount of hydrocarbon production.

The product gas mixture of our exemplary apparatus and process is practically devoid of molecular oxygen ($O_2$) and activated oxygen species ($O^{--}$, $O_3$, or $O^-$, and peroxide). The presence of these compounds risks explosion. In comparison, the prior art shows other processes that produce significant amounts of oxygen and such species.

At present, our best understanding of the reforming process is that within the high temperature, highly ionized environment of the plasma lens, with the effect of the rapidly reversing polarity, the electric current catalyzes the reformation of the compounds of the semiconductive mixture and the conductive mixture into more conductive species, such as in the case of our fuel gas synthesis apparatus and process, acetylene and other unsaturated hydrocarbons, instead of nonconductive saturated hydrocarbons.

TABLE IV

Product Gas Mixture Using Diesel Oil With Comminuted Lignite Coal; Ethylene Glycol + Water (Commercial Antifreeze) 5 Hrs After Startup

| Gas | Mole % | Gas | Mole % | Gas | Mole % |
|---|---|---|---|---|---|
| $H_2$ | 58.0 | $C_2H_6$ | 0.2 | $C_3H_8$ | 0.2 |
| CO | 22.7 | $C_2H_4$ | 2.4 | $C_3H_6$ | 0.8 |
| $CO_2$ | 0.8 | $C_2H_2$ | 9.5 | $C_4$ | 0.6 |
| $CH_4$ | 3.4 | — | — | $C_{5+}$ | 1.2 |

The embodiments described above and shown in FIGS. 1, 2, and 3 relates to a specific application of our invention to the synthesis of hydrocarbon fuel gas having a medium to high BTU rating with a minimum BTU fuel rating of 500 BTU per standard cubic foot. However, it will be understood that as described above, our invention may be used with compounds other than water, or with various different water based mixtures, in the formation of such hydrocarbons. Further, different types of insulative compounds may be employed as described above. Furthermore, our process and apparatus may be advantageously used to produce other product gas mixtures not necessarily for use as a synthesis fuel gas, but for use as synthesized chemical feed stock. For example, by referring to Tables I through IV, it may be seen that the molar ratio of hydrogen ($H_2$) the carbon monoxide (CO) is consistently about 3 to 1 and always less than 4 to 1. A three-to-one (3:1) ratio of hydrogen ($H_2$) to carbon monoxide (CO) is a standard chemical feed stock for a great many chemical industrial processes. A chemical producer may obtain the desired, standard molar ratio feed stock at his plant, using water, comminuted lignite coal and one of several oils as described above, with an onsite, inexpensive, versatile apparatus and method, that can use other varied sources of hydrocarbons as described below.

Some examples of possible beneficial uses of synthesis apparatus and methods of our invention follow:

(1) Ammonia production: 3 moles hydrogen plus 1 mole nitrogen yields 2 moles ammonia.

(2) Methanol production: 2 moles hydrogen plus 1 mole carbon monoxide yield one mole of methanol.

(3) Motor fuel production: by "Fischer-Tropsch" process, currently used in South Africa.

(4) Production of aldehydes and alcohols using one mole of hydrogen and one mole of carbon monoxide.

(5) Gas synthesis using hydrocarbons and carbon in sewage effluent added to water in synthesis apparatus.

(6) Gas synthesis using as conductive mixture, unusable sewer water, brackish water, or industrial steep water.

(7) Reforming toxic chemicals, such as PCB, pesticide and herbicide pollutants in water, as the conductive mixture, by breaking up long chain toxic compounds into harmless compounds during reformation in the processes disclosed above.

(8) Using asphalts, tars, pitches, crankcase oil, or other waste or low value hydrocarbons.

Because the structure and nomenclature associated therewith described above relates to the particular embodiment for producing synthesized fuel gas, the following discussion will relate the broad terms of the claims and the nomenclature used therein to the specific structural embodiments and method.

The water stratum 12 within the tank may be seen to function as a conductor spaced a gap from the electrode. As used herein, the term conductor is broad enough to include another electrode or solid conductor that is insulated from the electrode by an insulative mixture. The semiconductive emulsoid and oil layers 14, 16, and 18 respectively may all three be seen to form insulative mixtures. In the functioning of the embodiment shown in FIGS. 1, 2, and 3, the semiconductive mixture or stratum functions as the insulative mixture.

The capacitor or capacitance connected in parallel with the source of AC electricity may be seen to be a device or means for modifying the current and voltage waveforms of the alternating electrical current connected across the electrode and interface so that the power factor of the AC electricity connected across the gap approaches unity. Thus, the device for accomplishing this modification of the waveform is not intended to be limited to the specific transformer and capacitor disclosed above, since the electronic devices for accomplishing this will depend upon variation and types of transformers electrodes, insulative and conductive mixtures, and source alternating electrical current.

It will be understood that the positioning of the insulative and conductive mixtures are not necessarily as shown in the drawings of this application in that our process and apparatus contemplates the use of a conductive mixture that is immiscible and less dense than the insulative mixture such that the conductive mixture is positioned above the insulative mixture as in place of the water and using diesel oil as the insulative mixture.

As shown in FIGS. 1, and 3, recycle mainfolds 96 are fluidly connected to recycle pump 98 for pumping a portion of the product gas back into the tank, as described more fully later. Sparge tubes 100 within the trays 56 have perforations therealong, and are adapted to introduce selected fluids within the chambers and/or within the plasma lenses or voids. For example such sparge tubes could be used to bubble nitrogen into the chambers where reaction of product gases in the presence of a catalyst with the nitrogen could produce ammonia.

FIG. 3 somewhat schematically shows the tank described in FIGS. 1 and 2 along with the pertinent structure for processing the liquids and gases used and produced during the synthesis process within the synthesizing apparatus or tank 10. The tank 10 preferably has a pressure relief valve 110 at the top thereof to prevent catastrophic explosions should the pressure in the tank exceed certain safe limits which may be preselected according to the construction of the tank 10 used.

The line from the tray pump 70 is fluidly connected to the tank bottom at bottom outlet 112. Blow down valve 114 is conveniently positioned in the pipe connecting the pump outlet to the tray manifold 68. When it is desired to empty or blow down the tank 10, the pump is activated and the blow down valve opened.

Raw water inlet 116 is proximate the bottom of the tank 10 and is fluidly connected to a source of raw water by raw water line 118 with raw water valve 120 conveniently positioned therein. The raw water valve is preferably electrically controlled by water level control 122, conveniently positioned in the tank so that the level of the water strata is maintained substantially constant. This level control may be placed on the raw water input since it is anticipated that the water pumped from the water strata will be substantially constant with overflow from the reservoirs being slightly less to account for water that is chemically reformed. Therefore, the additional raw water will only require an input through the raw water line 118 and valve 120 as it is used during the process.

Emulsoid outlet 124 is positioned in the tank 10 side at an elevation slightly above the level of the water strata 12 or in other words near the lower levels of the semiconductive stratum 14. The emulsoid outlet is connected to the intake of emulsoid pump 126 by emulsoid line 128.

The outlet of the emulsoid pump 126 is connected to reboiler 130 by reboiler line 132. The reboiler would use waste heat from other chemical processes, or heat from some economical source such as from the exhaust manifolds, or from cooling water, of an internal combustion engine. Of course, the reboiler 130 has pressure relief valve 134, as required by most safety regulations. The reboiler will drive off the volatile and lighter hydrocarbons that may have been dissolved in the semiconductive or emulsoid strata.

The liquid output of the reboiler that is the mixture left over after the volatiles have been driven off is fed through return line 138 connecting the reboiler 130 to emulsoid inlet 140 in the side of the tank 10 at an upper level of the emulsoid stratum 16.

Emulsoid valve 142 in the return line 138 is preferably an electrically actuated valve controlled by emulsoid level control of 144. The comminuted coal tends to settle toward the bottom of the semiconductive layer at the interface between the water and the semiconductive stratum 14. Much of this coal is removed by circulation through the emulsoid outlet 124 therefore there is a continual replenishment of the comminuted coal by virtue of the emulsoid inlet. The emulsoid pump 126, coal source 149, oil tank 151, mixer 150 and mixer line 152 all form emulsoid means for mixing comminuted lignite coal with the oil to form an emulsoid within the tank.

We prefer to withdraw oil from oil outlet 146 positioned in the upper levels of the oil stratum 18 and the side of the tank 10. Oil line 148 connects the oil outlet 146 to mixer 150. The mixer 150 is fed comminuted coal from a source thereof (not shown). The mixer thoroughly mixes the coal and oil which is then fed to the input of the emulsoid pump. Because, all of the oil removed from the oil stratum 18 is reintroduced via the emulsoid pump the fluid balance thereof is assured.

Mixer 150 is connected to the emulsoid pump inlet by mixer line 152. It may also be seen that the volatiles in the oil stratum may be driven off and supplied to the product gas or fuel or feed stock because they are fed through the reboiler along with the emulsoid withdrawn from the semiconductive layer.

The gaseous or volatile output of the reboiler 130 is flowed to a flash tank or separator to separate the water vaporized by the reboiler from the immiscible hydrocarbon gaseous constituents thereof. The reboiler is connected to the separator 154 by separator line 156. Separator pressure valve 158 in the separator line 156 maintains pressure in the reboiler to permit control of the content of the product gas ultimately recovered from the oil strata 14, 16, and 18.

Water separated from the volatiles from the reboiler is recycled to the water stratum 12 at water inlet 160 by water line 162. The volatile hydrocarbon gases are combined with the product gases removed from the gas stratum 20 and used as fuel or feed stock, as described hereafter.

Gas disposal outlet 164 in the tank 10 is at substantially the level of the gas strata 20. The gas disposal outlet is fluidly connected to scrubber 166 by gas outlet line 168. The scrubber cooler is connected to gas line 170 which is connected to disposal line 172 which connects the gas to the ultimate use point.

Gas recycle line 174 connects the gas line 170 to a gas compressor for recycling a portion of the product gas collected in the gas compressor 98. The gas compressor 98 is connected to the recycle manifolds 96 as described above.

Internal combustion engine 180 is schematically shown in FIG. 3 and includes fuel line 182, air intake 184, transmission 186, and drive shaft 188, for operatively connecting the engine to pump head 190. The pump head 190 includes transmission housing 192, pump shaft 194, and water discharge 196. Cooling housing 197 flows the water discharged from the pump head 190 around cooling coils 198 to remove heat from engine coolant flowed through the coils 198 by coolant hoses 197 connected to the engine where radiation hoses are normally connected.

We have determined that is is unnecessary to compress the product gas flowed from the gas line to the fuel line to the engine although compression could be done if desired. Of course the internal combustion engine 180 has been specifically adapted to burn the synthesis gas produced herein by appropriate adjustment of the carburetor and ignition timing as well as other modifications well within the skill of one with ordinary skill in the internal combustion engine repair and maintenance art. The operation of the engine rotates the drive shaft, which rotates the pump shaft causing the discharge of water from below the ground through the discharge 196. Fuel diversion valve 200 in the fuel line 182 is fluidly connected to storage tank 202 by storage line 204. When the operation of the internal combustion engine for irrigation purposes is not desired, fuel may be stored in the storage tank for convenient use thereafter, thereby permitting the continuous operation of the synthesis apparatus and process to produce synthesized fuel gas over time. This may be further augmented by the use of windmill or wind generators to produce the electricity such that fuel gas may be made continuously while wind is sufficient to power the the process.

As the chemical reformation of components and compounds within the mixtures continues, the characteristic, especially the electrical conductivity of the conductive insulative mixtures or the water stratum and semiconductive stratum, will change over time. It is within the scope of our invention to accommodate this change in electrical conductivity and composition by either varying the capacitance value of the capacitor in parallel with the source of electricity responsive to any changes in resistance across the gap or changes in resistance of the conductive mixture, or alternatively, to change the resistance across the gap by either changing the distance or spacing of the gap or by changing the electrical conductivity of the mixtures. For example, it is well within the skill of an electrical engineer to design an electronic circuit that could sense a shift in the phase difference or between the voltage and current waveforms, or a decrease in the power factor and to adjust the capacitance value across the transformer terminals and then parallel with the source of alternating electrical current to maintain the power factor as close to unity as feasible. As an example of the alternate structure and method, as the conductivity of the insulative mixture increased, a mechanical device could raise the adjustable electrodes and chambers or although not shown, an adjustable positioned tray, to increase the arc gap and thereby increase the resistance to maintain the power factor close to unity. Alternatively, the circulating flows and devices disclosed in FIG. 3 and described above, could sense changes in the conductive characteristics of the mixtures and change or alter the return fluid so as to maintain a desired conductivity.

We prefer the last of the above alternatives, such that mixture withdrawn from the semiconductive stratum is processed to remove the conductive materials produced during the synthesis process, and is then returned to the emulsoid stratum, thereby maintaining the electrical conductivity of the mixture about the plasma substantially constant. Similarly, a scrubber or filter unit could be placed in the water recycle stream, although we have not determined that this is necessary in prolonged use.

The particular structure schematically shown in FIG. 3 for processing the fluids and product gas mixture is not essential to the functioning of the method or apparatus or the production of the product of our invention since the product gas mixture described in the experimental data disclosed above was obtained without this appurtenant structure. It will be understood that other means of maintaining fluid levels of recovering volatiles from the liquid strata and of mixing the same could be employed and still be within the scope of our invention.

Figure 4:
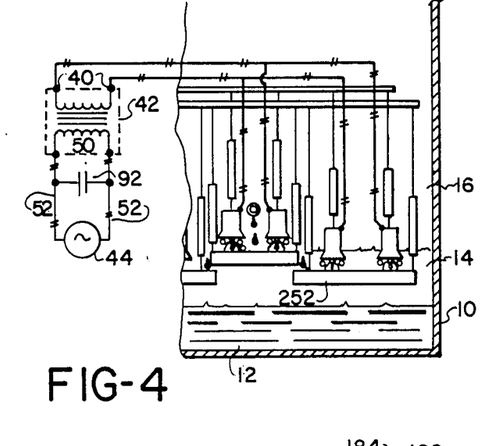
FIG. 4 is a section view of an alternate embodiment of the tray disclosed in FIGS. 1, 2 and 3.

FIG. 4 discloses an alternate embodiment of the trays wherein the overflow lip 250 of one tray is positioned over and above the open top of a second tray 252. Thus, by stair stepping the trays there need only be a single recycle tray pump. It may also be seen in FIG. 4 that the trays are insulated from the tank and that the alternating electrical current produced at the secondary winding is connected across pairs of the electrodes such that the electrical circuit is from one electrode tip of the electrode pair to the interface, through the water, and from the interface to the electrode tip of the electrode pair. It will be understood that either electrical connection of FIGS. 1, 2, and 3, or FIG. 4 produces the same result: The initial repetitive production of an arc across the gap, resulting in a plasma lens.

Figure 7:
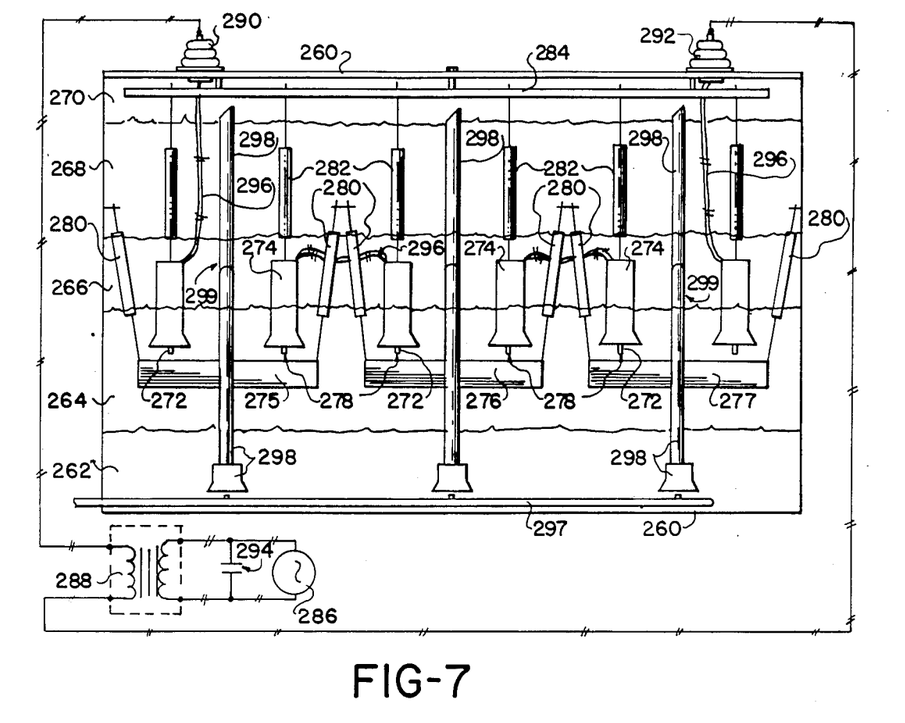
FIG. 7 is an end section view of another embodiment showing the best mode of our invention.
Figure 8:
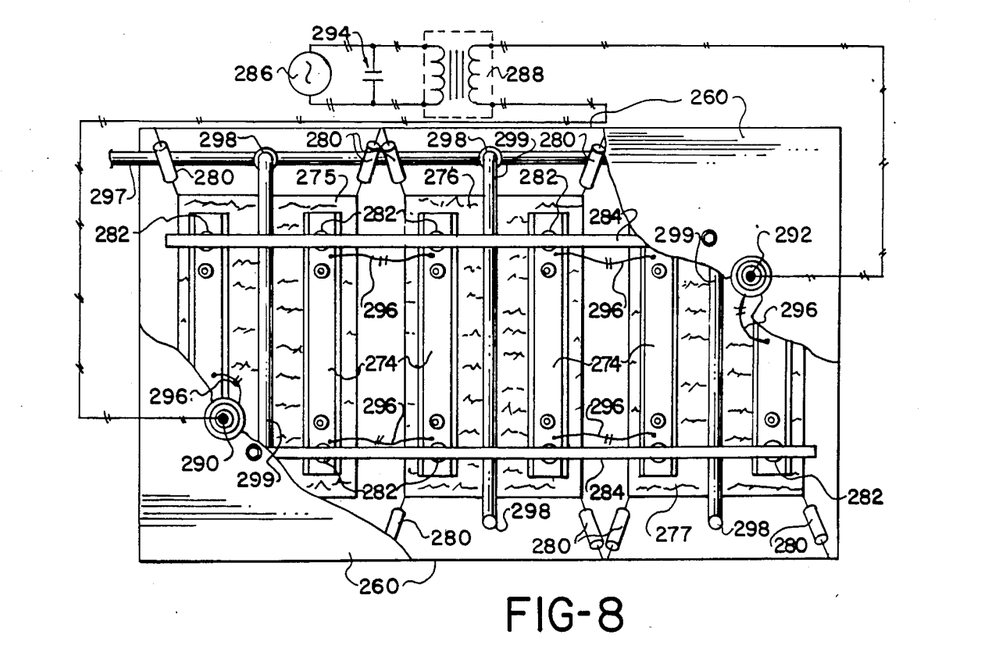
FIG. 8 is a top view of the apparatus shown in FIG. 7.

FIGS. 7 and 8 show what we regard as the best mode of our invention for large scale application. When the number of electrodes and the gas production is increased, the electrical power requirements also increase. It is necessary to have resistance sufficient to permit stable, accurate control of the high voltage produced by large power transformers.

We most prefer to use insulated trays and electrical current flow between pairs of electrodes, similar to the structure shown in FIG. 4. However, instead of the parallel connections of the electrode pairs, we prefer to increase the resistance for the reasons mentioned above by connecting the pairs for series current flow.

Tank 260 has water stratum 262, semiconductive stratum 264, emulsoid stratum 266, insulative stratum 268, and gas stratum 270 therein, similar to the tank 10 and strata 12, 14, 16, 18, and 20 described above. Electrodes 272 depend or subtend from chambers 274, with trays 275, 276, and 277 spaced an arc gap below electrode tip 278 of respective pairs of the electrodes, the chambers, electrodes and trays having a construction similar to those shown in FIGS. 1, 2, and 3. Tray insulators 280 are attached to side walls of the tank 260, and suspend the trays 276 at fixed positions in the tray. Chamber insulators 282 suspend the chambers 274 from adjustment bars 274. The adjustment bars 284 provide for raising and lowering the chambers, thereby varying the arc gap spacing.

A source of AC 286 is electrically connected across the primary windings of step up transformer 288. The secondary windings of the transformer 288 are electrically connected across tank insulators 290 and 292. A capacitor 294 is connected across the primary windings, as for the transformer 42 shown in FIGS. 1, 2, and 3.

Wires 296 connect the tank insulators 290 and 292 to one of the chambers 274 positioned above the trays 275 and 277, respectively. The other chambers positioned above the trays 275 and 277 are each connected by wires 296 to one of the chambers positioned above the tray 276. Thus, as shown in FIGS. 7 and 8, the electrical circuit between the secondary windings of the transformer 288, is through the tank insulators 290 and 292, the wires 296, the chambers 274, the electrodes 272, and the conductive mixture in the trays 275, 276 and 277, all connected in series.

FIGS. 7 and 8 also show preferred airlift pipe 298 for many applications, wherein recycled product gas is bubbled from recycle outlet 297 at the tank 260 bottom into the pipe 298 within the conductive stratum 262, which causes the pipe 298 to function as an airlift pipe. The gas within the pipe 298 carries conductive mixture upward to sprinkler pipes 299 until it drops from small orifices in the pipes 299 positioned above the tray 275, 276, and 277. It will also be understood that other fluid circulation within the tank 260, and the tank 10, could employ this economical and efficient pumping structure.

Figure 5:
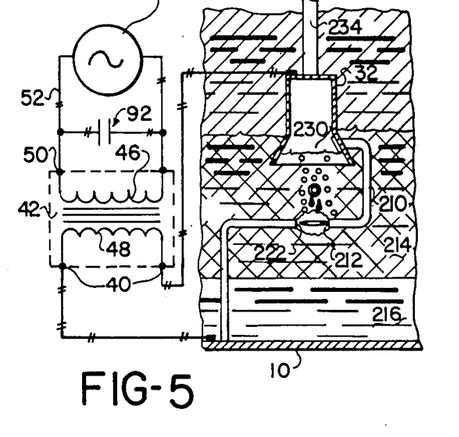
FIG. 5 is an end view of an alternate embodiment utilizing two electrodes instead of an electrode and a liquid interface.

Although the preferred form of the conductor spaced apart from and opposed to the electrode tip is the interface between the conductive and insulative mixtures, as described above, another form of the conductor could be that shown in FIG. 5. The electrode 210 and electrode tip 212 are disposed within insulative layer 214, spaced well above conductive mixture 216 below and immiscible with the insulative mixture 214.

The conductor is in the form of other electrode 220 having electrode tip 222, disposed within the insulative layer 214. The electrode tips 212 and 222 are spaced apart a desired gap and are insulated from each other by the insulative mixture 214. When the voltage is sufficient to overcome the resistance of the insulative mixture between the electrodes, by electrically breaking down compounds of the mixture, the repetitive arcs and resulting plasma will be produced between the electrode tips.

For this embodiment we prefer to decrease the resistivity between the electrode tips by dropping conductive mixture from injection or insertion means in the form of injection or insertion pipe 230 disposed within the insulative mixture 214 above the gap between the electrode tips 212 and 222, for injecting or inserting conductive matter in the gap. The conductive mixture is dispensed from the pipe 230 and drops between the electrodes, thereby decreasing the resistivity across the gap, and producing an arc and resultant plasma lens for steady state operation.

The injection or insertion means described above and for the embodiment shown in FIGS. 7 and 8, are exemplary structure and method for inserting or injecting liquid conductive matter. It will be understood that solid material, such as comminuted coal, or a slurry of solids, could also be dropped or mixed into the insulative or conductive mixtures, and still be within the scope of our invention. For the embodiment of FIGS. 7 and 8, the sprinkler pipes 299 and airlift pipe 298, may also be referred to as supply means for flowing conductive mixture to the trays 275, 276, and 277.

For this embodiment, both mixtures are present between the electrode and conductor, in the vicinity of the plasma, for chemical reformation. Any conductive mixture that is not chemically reformed conveniently drops to the conductive mixture 216. We prefer to set the flow to the water or conductive mixture consumption rate, resulting in little flow to the mixture 216. A chamber 232, is positioned above the sprinkler pipe 230 for collection of the product gases, similar to the structure and method disclosed in connection with the embodiment described in FIGS. 1, 2, and 3. The pipe 230 is insulated from the chamber 232, and spaced from the chamber 232 and the electrodes 210 and 220 sufficiently to avoid short circuit therebetween.

Although the embodiment shown in FIGS. 1, 2, and 3 is preferred for the production of moderate to high BTU fuel gases, the structure shown in FIG. 4 may prove advantageous for producing other compounds by chemically reforming compounds other than water and hydrocarbons.

Fine solid phase inhomogeneities (coal, lignite, biomass or catalyst particulates) dispersed within the oil phase contribute to electrical enhancement of the unit as well as the chemical change transformation. According to one theory (electron avalanche) the inhomogeneities act as local concentration points for electrons and charged species within the electrically insulating oil. As the potential builds to a corona discharge, electron avalanches cascade along paths connecting the inhomogeneities within the oil. Since the particles are in the direct path of electron flow, their structures are distorted and fragmented down to the molecular level. This releases hydrocarbons and provides reactants for other ionized species within the corona. In this way, our invention represents a unique synergistic combination of coal emulsoid, electrical capacitor, and bell reaction chamber which maximizes the conversion of electrical energy to a gaseous fuel. Moreover, this synergistic combination is effective to the point that the quality of the gaseous fuel produced is equal to or better than gaseous fuels produced by other processes.

The embodiment shown and described above is only exemplary. We do not claim to have invented all the parts, elements, or steps described. Various modifications can be made in the construction, material, arrangement, and operation, and still be within the scope of our invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing the following catalog of elements is provided:

Catalog of Elements 10 tank
12 water stratum
13 waveform
14 semiconductive stratum
16 emulsoid stratum
18 oil stratum
20 gas stratum
22 electrodes
24 chambers
26 insulators
28 suspension bars
30 adjustment members
32 insulators
34 electrode wires
36 tabs
38 tab screws
40 secondary terminals
42 transformer
44 source of electrical current
46 primary windings
48 secondary windings
50 primary terminals
52 source wires
54 tank wire
56 open topped tray
58 sides
60 bottom
62 open top
64 overflow lips
66 tray pipes
68 tray manifold
70 tray pump
72 electrode tip
73 plasma lens
74 tray wires
76 open bottom
78 flared sides
80 straight sides
82 top
84 ends
86 bottom edges
88 gas tubes
90 pressure valves
91 catalyst screens
92 capacitor
96 recycle manifolds
98 recycle pump
100 sparge tubes
110 pressure relief valve
111 bottom valve
112 bottom outlet
113 filter
114 blow down valve
115 raw water source
116 raw water inlet
118 raw water line
120 raw water valve
122 water float
124 emulsoid outlet
126 emulsoid pump
128 emulsoid line
130 reboiler
132 reboiler line
134 pressure relief valve
138 return line
140 emulsoid inlet
142 emulsoid valve
144 emulsoid float
146 oil outlet
148 oil line
149 coal source
150 mixer
151 oil tank
152 mixer line
154 separator
156 separator line
158 separator pressure valve
160 water inlet
162 water line
164 gas disposal outlet
166 scrubber
168 gas outlet line
170 gas line
172 disposal line
174 gas recycle line
180 internal combustion engine
182 fuel line
184 air intake
186 transmission
188 drive shaft
190 pump head
192 transmission housing
194 pump shaft
196 water discharge
197 cooling housing
198 cooling coils
199 coolant hoses
200 fuel diversion valve
202 storage tank
204 storage line
210 electrode
212 electrode tip 214 insulative layer
216 conductive mixture
220 electrode
222 electrode tip
230 insertion pipe
232 chamber
250 overflow lip
252 second tray
260 tank
262 water stratum
264 semiconductive stratum
266 emulsoid stratum
268 insulative stratum
270 gas stratum
272 electrodes
274 chambers
275 tray
276 tray
277 tray
278 electrode tips
280 insulators
282 insulators
284 adjustment bars
286 source of AC
288 transformer
290 tank insulator
292 tank insulator
294 capacitor
296 wires
297 recycle outlet
298 airlift pipe
299 sprinkler pipes

SUBJECT MATTER CLAIMED FOR PROTECTION

I claim as my invention:

1. A process involving
   a. a fluid-tight tank,
   b. an insulative mixture that includes an electrically nonconductive liquid compound within the tank, and
   c. an electrode disposed within the insulative mixture;
   wherein a process for chemically reforming compounds within the tank comprises the steps of:
   d. insulating the electrode from an electric conductor with the insulative mixture,
   e. connecting alternating electrical current, having a voltage waveform and a current waveform, across the electrode and the conductor,
   f. repetitively producing an arc between the electrode and the conductor with the alternating electrical current, until
   g. establishing a stable plasma of partially ionized gases between the electrode and the conductor with the alternating electrical current,
   h. placing a capacitor in electrical circuits connected to the electrode which modifies a phase difference between the voltage and current waveforms of the alternating electrical current connected across the electrode and conductor producing the plasma so that the power factor of the alternating electrical current approaches unity.

2. The process as claimed in claim 1 wherein the electrical conductor is a conductive mixture within the tank that includes an electrically conductive liquid compound that is substantially immiscible with the electrically nonconductive liquid compound of the insulative mixture.

3. The process as claimed in claim 1 wherein the electrical conductor is an other electrode having an electrode tip disposed within the insulative mixture, with the electrode tips spaced apart.

4. The invention as defined in claim 2 including all of the limitations a. through h. with the addition of the following limitations:
   i. maintaining an interface between the mixtures at a fixed gap from the electrode by
   j. flowing the conductive mixture into a tray having an open top disposed within the insulative mixture opposite the electrode,
   k. overflowing conductive mixture from the tray, and
   l. maintaining a constant level of the conductive mixture within the tray.

5. A process involving
   a. a fluid-tight tank,
   b. an insulative mixture that includes an electrically nonconductive liquid compound within the tank, and
   c. an electrode disposed within the insulative mixture;
   wherein a process for chemically reforming compounds within the tank comprises the steps of:
   d. connecting alternating electrical current having a voltage waveform and a current waveform across the electrode and the conductor, an electrical conductor insulated from the electrode by the insulative mixture,
   e. repetitively producing an arc between the conductor and the electrode with the alternating electrical current,
   f. establishing a stable plasma of partially ionized gases between the electrode and the conductor with the alternating electrical current,
   g. collecting product gases escaping from the stable plasma, within a chamber having an open bottom positioned within the nonconductive mixture above the plasma,
   h. pressurizing a product gas mixture, formed from the collected gases, within the chamber sufficiently to exclude liquids from the chamber through the open bottom to a desired extent, and
   i. flowing the product gas mixture within the chamber to a gas outlet from the chamber, thereby
   j. reducing contact of the product gas mixture with liquids within the tank, and
   k. maintaining gases of the product gas mixture in contact in a substantially gaseous phase for a finite residence time within said chamber.

6. The invention as defined in claim 5 including all of the limitations a. through m. with the addition of the following limitation:
   n. modifying the phase difference between the voltage and current waveforms of the alternating electrical current connected across the electrode and the conductor so that the power factor thereof approaches unity.

7. The process as claimed in claim 5 wherein the electrical conductor is a conductive mixture within the tank that includes an electrically conductive liquid compound that is substantially immiscible with the electrically nonconductive liquid compound of the insulative mixture.

8. The process as claimed in claim 5 wherein the electrical conductor is an other electrode having an electrode tip disposed within the insulative mixture, with the electrode tips spaced apart.

9. The invention as defined in claim 7 including all of the limitations a. through k. with the addition of the following limitations:
l. maintaining an interface between the mixtures at a fixed gap from the electrode by
m. flowing the conductive mixture into a tray having an open top disposed within the insulative mixture opposite the electrode,
n. overflowing conductive mixture from the tray, and
o. maintaining a constant level of the conductive mixture within the tray.

10. A process involving
a. a fluid-tight tank,
b. an insulative mixture that includes liquid hydrocarbons within the tank
c. a conductive mixture that includes liquid water, within the tank,
d. the insulative mixture being immiscible with the conductive mixture;

wherein a chemical reforming process for synthesizing a product gas mixture, having a minimum BTU fuel rating of 500 BTU per standard cubic foot, comprises the steps of:
e. mixing comminuted coal particles with the insulative mixture, and
f. forming an emulsoid of the comminuted coal particles and the insulative mixture that is immiscible with the conductive mixture,
g. developing an emulsoid stratum of the emulsoid, within the insulative mixture, that is supernatant to the conductive mixture,
h. insulating an electrode disposed within the emulsoid stratum from the conductive mixture,
i. maintaining an interface, between the emulsoid and the conductive mixture, a fixed gap from the electrode,
j. connecting alternating electrical current across the electrode and the conductive mixture,
k. repetitively producing an arc between the electrode and the interface with the alternating electrical current,
l. establishing a stable plasma lens of partially ionized gases between the electrode and the interface with the alternating electrical current,
m. forming an electrophoresis-induced vortex of fluids and charged particles from the conductive mixture and the emulsoid about the plasma lens,
n. placing a capacitor in electrical circuits connected to the electrode which modifies the phase difference between voltage and current waveforms of the alternating electrical current connected across the electrode and interface so that the power factor of the alternating electrical current so connected approaches unity,
o. collecting product gases escaping from the plasma lens within an open bottomed chamber positioned above the plasma lens,
p. pressurizing a product gas mixture, formed from the collected product gases, within the chamber sufficiently to exclude liquids therefrom to a desired extent,
q. flowing the product gas mixture from the chamber through an outlet pipe to a gas outlet,
r. reducing contact of the product gas mixture with liquids within the tank, and
s. maintaining gases of the product gas mixture in contact in a substantially gaseous phase for a finite residence time.

11. The invention as defined in claim 10 including all of the limitations a. through s. with the addition of the following limitations:
t. performing the maintaining step "i." above by
u. flowing the conductive mixture into a tray having an open top disposed within the insulative stratum, opposite the electrode,
v. overflowing conductive mixture from the tray at an overflow lip thereof,
w. maintaining a constant maximum level of the conductive mixture within the tray.

12. The invention as defined in claim 10 including all of the limitations a. through s. with the addition of the following limitation:
t. catalytically reforming components of the product gas mixture in the presence of a catalyst located within the chamber.

13. The invention as defined in claim 10 including all of the limitations a. through s. with the addition of the following limitations:
t. performing the "modifying" step "q." above by
u. presetting an electrical circuit connecting a source of alternating electrical current across the electrode and the conductive mixture so that when a predetermined electrical resistance exists across the gap for a preselected voltage potential and gap spacing the power factor of the alternating electrical current connected across the gap approaches unity,
v. varying the resistance across the gap to substantially maintain the predetermined electrical resistance responsive to changes in conductivity of matter between the electrode and the interface.

14. The invention as defined in claim 10 including all of the limitations a. through s. with the addition of the following limitations:
w. performing the "varying" step "u." above by
x. mixing selected compounds with at least one of the emulsoid and the conductive mixtures, the selected compounds having an appropriate electrical conductivity to change the resistance across the gap to the predetermined electrical resistance.

* * * * *